United States Patent
Tsuboi (10) Patent No.: US 6,600,787 B2
(45) Date of Patent: Jul. 29, 2003

(54) MPEG DECODING DEVICE (75) Inventor: Eiji Tsuboi, Tokyo (JP)

(73) Assignee: NEC Electronics Corporation, Kanagawa (JP)

( * ) Notice: Subject to any disclaimer, the term of this patent is extended or adjusted under 35 U.S.C. 154(b) by 372 days.

(21) Appl. No.: 09/761,776

(22) Filed: Jan. 18, 2001

(65) Prior Publication Data
US 2001/0009567 A1 Jul. 26, 2001

(30) Foreign Application Priority Data

Jan. 20, 2000 (JP) ........................................ 2000-012227

(51) Int. Cl.[7] ................................................ H04N 7/58
(52) U.S. Cl. .................. 375/240.25; 348/512; 348/515; 375/240.25
(58) Field of Search ....................... 375/240.25, 240.28; 348/512, 515; H04N 7/58

(56) References Cited

U.S. PATENT DOCUMENTS

| 5,920,572 A | 7/1999 | Washington et al. ........ 370/353 |
| 5,960,006 A | 9/1999 | Maturi et al. ................ 370/509 |
| 6,101,195 A * | 8/2000 | Lyons et al. ................. 348/512 |

FOREIGN PATENT DOCUMENTS

| EP | 0 881 838 | 12/1998 |
| EP | 0 896 479 | 2/1999 |
| EP | 0 940 986 | 9/1999 |

* cited by examiner

Primary Examiner—Howard Britton
(74) Attorney, Agent, or Firm—Foley & Lardner (57) ABSTRACT

An MPEG decoding device is designed to decode multiple packetized elementary streams (PES) representing video signals and/or audio signals, which are bit streams compressed by the MPEG system in satellite digital broadcasting, for example. Herein, the multiple packetized elementary streams are stored in plural code buffers respectively. A selector selects one of the packetized elementary streams by a time division system, so that a PES decoder separates the selected packetized elementary stream to a PES header and an elementary stream. A time information holder holds time information being extracted from the PES header. An MPEG decoder decodes the elementary stream with reference to the time information. Namely, the MPEG decoder decodes pictures of the elementary stream in a decode order in connection with the time information, then, decoded pictures are rearranged and output in a display order. Because of provision of a single set of the PES decoder, time information holder and MPEG decoder with respect to processing of multiple packetized elementary streams, it is possible to reduce a circuit configuration of the MPEG decoding device in scale, and it is also possible to provide easy management on relationships between pictures and time information.

7 Claims, 6 Drawing Sheets

DECODE ORDER

FIG. 5B

DISPLAY ORDER

MPEG DECODING DEVICE

BACKGROUND OF THE INVENTION

1. Field of the Invention

This invention relates to MPEG decoding devices (where "MPEG" is an abbreviation for "Moving Pictures Expert Group") that decode video signals and/or audio signals which are compressed based on the MPEG system, and particularly to MPEG decoding devices that are capable of decoding multiple bit streams.

2. Description of the Related Art

Recently, bit streams that are produced by compression based on the MPEG system are used for video signals (representing moving pictures) and audio signals (representing sound and/or speech) which are subjected to transmission by the satellite digital broadcasting. For this reason, television receivers that receive signals of the satellite digital broadcasting install MPEG decoding devices for decoding the bit streams compressed by the MPEG system.

A conventional example of the MPEG decoding device contains a PES decoder, a code buffer, a time information buffer and an MPEG decoder. Herein, the PES decoder receives prescribed bit streams called "packetized elementary streams" (namely, PES) to divide them into PES headers and elementary streams. The code buffer temporarily stores the elementary streams that are isolated by the PES decoder. The time information buffer temporarily stores time information contained in the PES headers. Thus, the MPEG decoder decodes the elementary streams, temporarily stored in the code buffer, in connection with the time information that is temporarily stored in the time information buffer.

The conventional MPEG decoding device is designed to decode a single bit stream at once. For this reason, the conventional MPEG decoding device needs a single PES decoder and a single time information buffer. It is rational to employ in the MPEG decoding device for decoding a single bit stream a temporary storage configuration such that the PES decoder is followed by the code buffer for temporarily storing the elementary streams, which are isolated from the packetized elementary streams by removing the PES headers. As compared with a typical code storage for storing original packetized elementary streams accompanied with the PES headers, the aforementioned temporary storage configuration is advantageous in saving a storage area of the code buffer that merely stores the elementary streams being isolated from the original packetized elementary streams by removing the PES headers.

Recent trends in broadcasting provide users of the television receivers with plenty of channels by digital technologies. For this reason, engineers are requested to develop advanced MPEG decoding devices that are capable of coping with plenth of channels in broadcasting. Therefore, the engineers propose extended functions for the MPEG decoding devices, each of which is conventionally designed to decode a single bit stream at once, such that multiple bit streams can be decoded at once.

Figure 6:
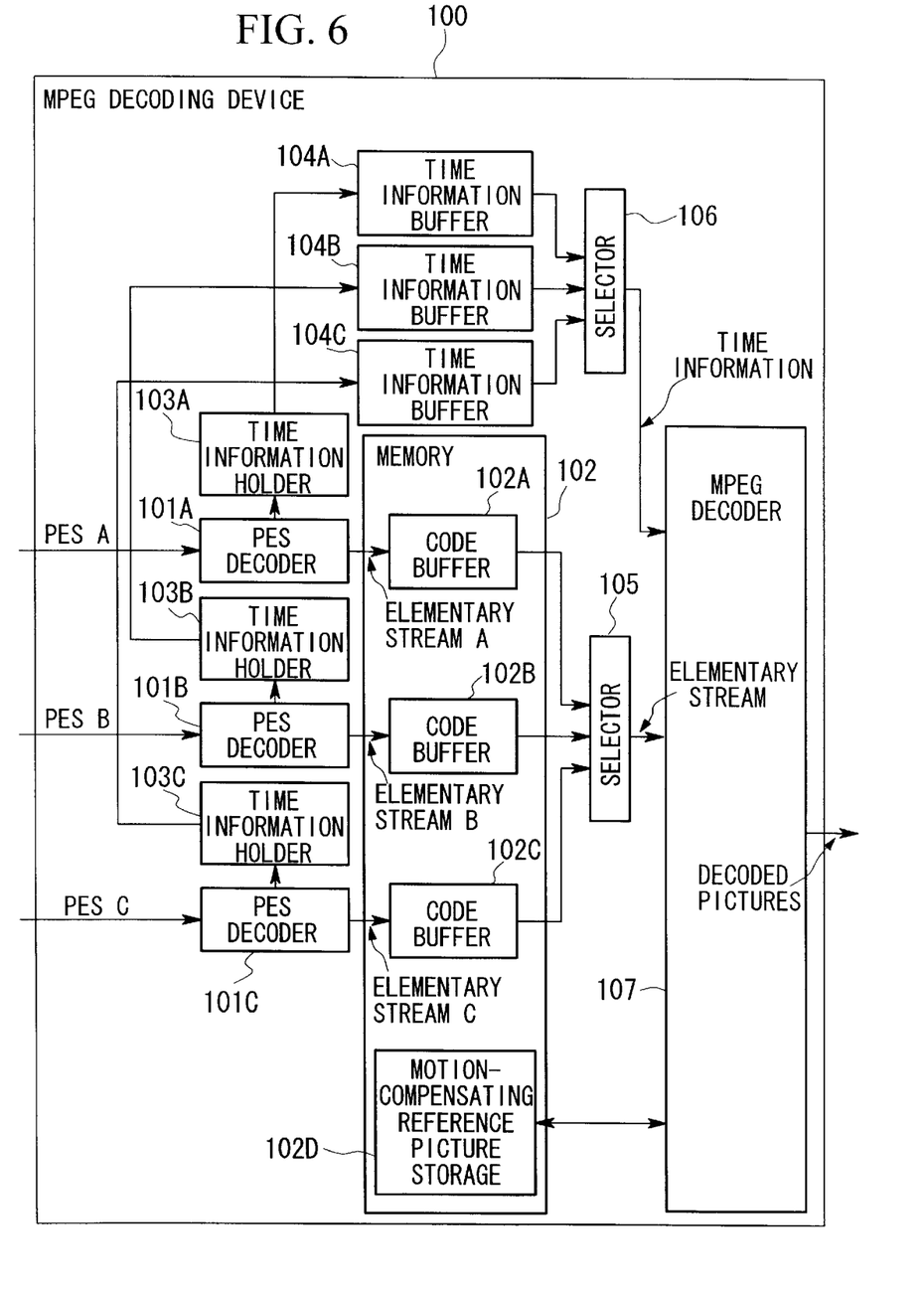
FIG. 6 is a block diagram showing a conventional example of an MPEG decoding device that performs decoding on multiple bit streams.

FIG. 6 shows an example of the MPEG decoding device that is capable of decoding multiple bit streams at once. Concretely speaking, the MPEG decoding device of FIG. 6 is designed to simultaneously decode three bit streams (or three packetized elementary streams). Namely, an MPEG decoding device 100 inputs three packetized elementary streams (PESs) A, B and C. Those streams respectively contain picture data being compressed by the MPEG system.

The PES A is subjected to separation to a PES header and an elementary stream A by a PES decoder 101A. The elementary stream A is temporarily stored in a code buffer 102A. At the same time, time information contained in the PES header is forwarded to a time information buffer 104A via a time information holder 103A, so that the time information is to be temporarily stored in the time information buffer 104A.

The aforementioned configuration corresponding to a set of the PES decoder, time information holder and time information buffer is similarly applied to the other PESs B and C. Namely, the PES B is subjected to separation to a PES header and an elementary stream B by a PES decoder 101B. The elementary stream B is temporarily stored in a code buffer 102B. At the same time, time information contained in the PES header is forwarded to a time information buffer 104B via a time information holder 103B, so that the time information is to be temporarily stored in the time information buffer 104B.

Similarly, the PES C is subjected to separation to a PES header and an elementary stream C by a PES decoder 101C. The elementary stream C is temporarily stored in a code buffer 102C. At the same time, time information contained in the PES header is forwarded to a time information buffer 104C via a time information holder 103C, so that the time information is to be temporarily stored in the time information buffer 104C.

The MPEG decoding device 100 employs a single MPEG decoder 107 that performs decoding on the three streams by a time division system. So, a selector 105 selects one of the three elementary streams A, B and C based on the time division system. In addition, a selector 106 selects the time information suited to the elementary stream presently selected by the selector 105 by the time division system. That is, the selectors 105 and 106 operate in synchronization with each other.

However, the conventional configuration of the MPEG decoding device that is designed to simultaneously decode multiple bit streams bears various problems, which will be described below.

The aforementioned MPEG decoding device should install multiple sets of the PES decoder and time information buffer respectively in connection with multiple packetized elementary streams. This increases a circuit scale of the MPEG decoding device considerably.

In synchronization with inputting of the elementary stream, the MPEG decoder inputs the time information corresponding to each of pictures in the elementary stream. In order to properly match the time information with each picture, the time information is being managed by the FIFO (namely, first-in-first-out) system in the time information buffer. The MPEG decoder performs the aforementioned operations on the multiple streams respectively. This makes management of the time information complicated.

SUMMARY OF THE INVENTION

It is an object of the invention to provide an MPEG decoding device that performs simple management on time information with a relatively small scale of circuitry.

An MPEG decoding device of this invention is designed to decode multiple packetized elementary streams (PES) representing video signals and/or audio signals, which are bit streams compressed by the MPEG system in satellite digital broadcasting, for example. Herein, the multiple packetized elementary streams are stored in code buffers respectively. A selector selects one of the packetized elementary streams by a time division system, so that a PES decoder separates the selected packetized elementary stream to a PES header and an elementary stream. A time information holder holds time information being extracted from the PES header. An MPEG decoder decodes the elementary stream with reference to the time information. Namely, the MPEG decoder decodes pictures of the elementary stream in a decode order in connection with the time information, then, decoded pictures are rearranged and output in a display order. Because of provision of a single set of the PES decoder, time information holder and MPEG decoder with respect to processing of multiple packetized elementary streams, it is possible to reduce a circuit configuration of the MPEG decoding device in scale, and it is also possible to provide easy management on relationships between pictures and time information.

BRIEF DESCRIPTION OF THE DRAWINGS

These and other objects, aspects and embodiment of the present invention will be described in more detail with reference to the following drawing figures, of which.

DESCRIPTION OF THE PREFERRED EMBODIMENT

This invention will be described in further detail by way of examples with reference to the accompanying drawings.

Figure 1:
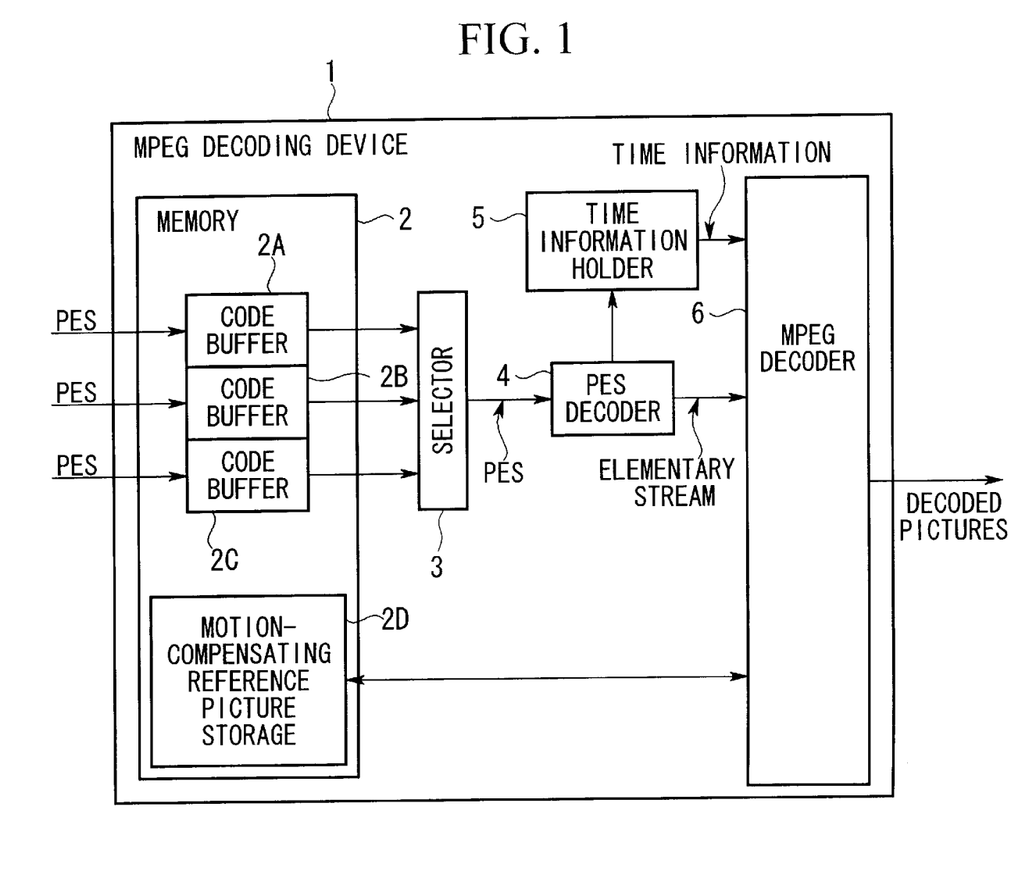
FIG. 1 is a block diagram showing a configuration of an MPEG decoding device in accordance with a preferred embodiment of the invention.

FIG. 1 shows a configuration of an MPEG decoding device 1 in accordance with a preferred embodiment of the invention. Herein, the MPEG decoding device 1 inputs three packetized elementary streams (PESs) A, B and C at once. Namely, the MPEG decoding device 1 contains a memory 2, a selector 3, a single PES decoder 4, a single time information holder 5 and a single MPEG decoder 6. The memory 2 stores the three PESs A, B and C inputted thereto as well as reference pictures which are referred to in decoding. The selector 3 selects one of the three PESs by a time division system, so that the PES decoder 4 divides the selected PES into a PES header and an elementary stream. The time information holder 5 holds time information contained in the PES header, while the MPEG decoder 6 decodes the elementary stream.

Specifically, the memory 2 contains three code buffers 2A, 2B and 2C for storing the three PESs A, B and C respectively. In addition, the memory 2 also contains a motion-compensating reference picture storage 2D for storing the reference pictures which are referred to in decoding.

The code buffer 2A inputs the PES A to temporarily store it therein. The code buffer 2B inputs the PES B to temporarily store it therein. The code buffer 2C inputs the PES C to temporarily store it therein.

The selector 3 selects one of the PESs A, B and C respectively output from the code buffers 2A, 2B and 2C by the time division system. The selected PES is forwarded to the PES decoder 4.

The PES decoder 4 divides the PES selected by the selector 3 into a PES header and an elementary stream. Then, time information contained in the PES header is delivered to the time information holder 5, while the elementary stream is delivered to the MPEG decoder 6.

The time information holder 5 holds the time information given from the PES decoder 4 for a while, then, the time information is to be forwarded to the MPEG decoder 6 at a prescribed timing.

The MPEG decoder 6 decodes the elementary stream given from the PES decoder 4 to output decoded pictures. In this case, the MPEG decoder 6 decodes pictures corresponding to the elementary stream to arrange or permute them in a prescribed display order in accordance with the time information given from the time information holder 5. Thus, the MPEG decoder 6 outputs the decoded pictures in the prescribed display order. In addition, the MPEG decoder 6 accesses the motion-compensating reference picture storage 2D to suit to needs in decoding. That is, the MPEG decoder 6 stores or picks up the reference pictures from the motion-compensating reference picture storage 2D on demand.

Figure 2:
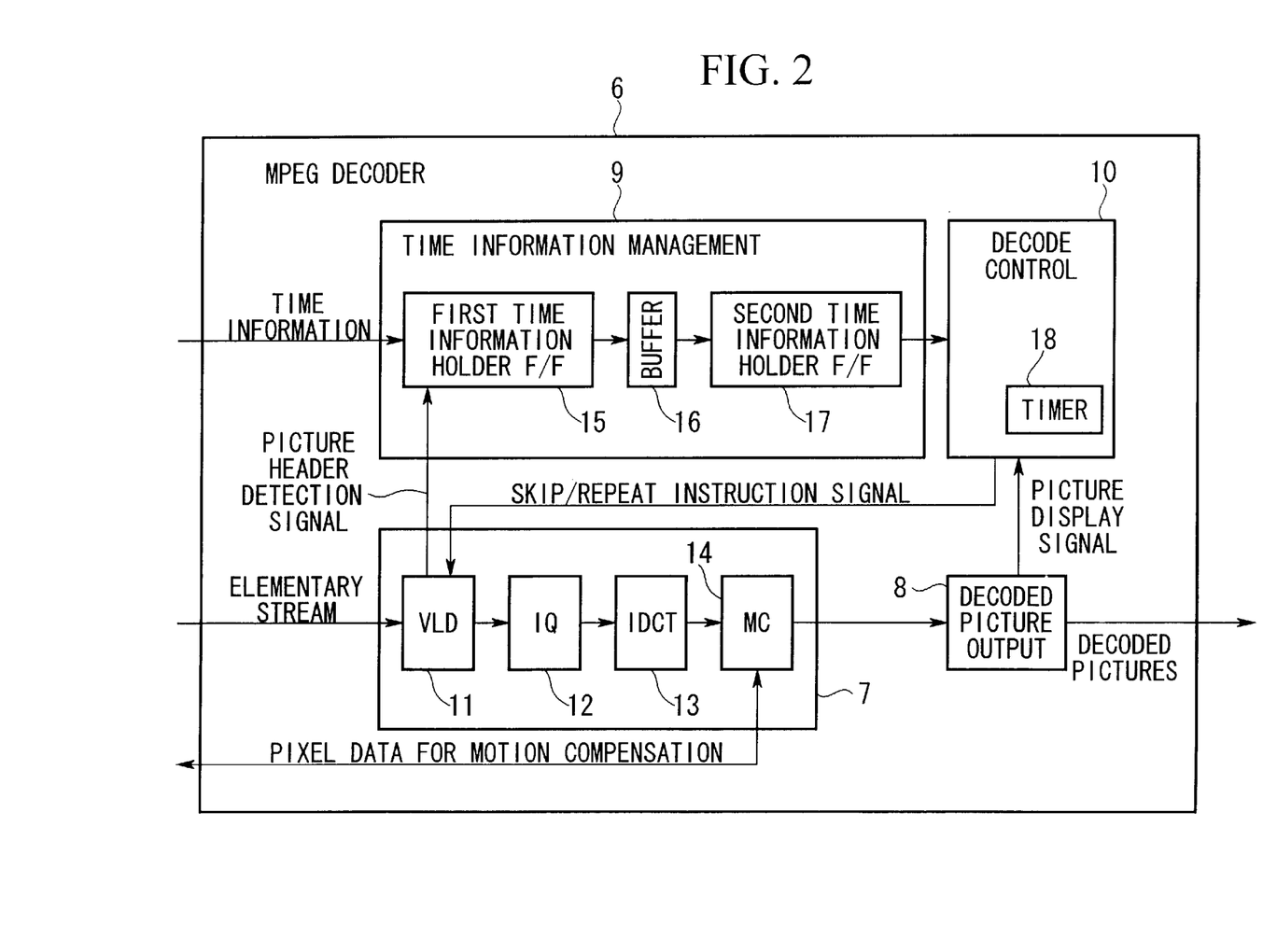
FIG. 2 is a block diagram showing an internal configuration of an MPEG decoder shown in FIG. 1.

FIG. 2 shows an internal configuration of the MPEG decoder 6. Namely, the MPEG decoder 6 contains a decode execution section 7 for decoding elementary streams, a decoded picture output section 8 for outputting decoded pictures, a time information management section 9 for managing time information and a decode control section 10 for controlling decoding operations in response to the time information.

Specifically, the decode execution section 7 contains four blocks, namely, a variable-length code decoder (VLD) 11 for decoding variable-length codes, an inverse quantizer (IQ) 12 for effecting inverse quantization on compressed data, a two-dimensional inverse discrete cosine transform (IDCT) 13 for effecting two-dimensional inverse discrete cosine transform and a motion compensator (MC) 14 that adds together an output of the IDCT 13 and the reference picture stored in the motion-compensating reference picture storage 2D.

The time information management section 9 contains a first time information holder F/F 15, a buffer 16 and a second time information holder F/F 17. Herein, the first time information holder F/F 15 holds time information of pictures being presently decoded by the decode execution section 7, while the second time information holder F/F 17 holds time information of pictures being presently output from the decoded picture output section 8.

The decode control section 10 contains a timer 18 that counts a reference time.

The variable-length code decoder 11 inputs the elementary stream supplied thereto from the PES decoder 4. When detecting a picture header within the elementary stream, the variable-length code decoder 11 outputs a picture header detection signal to the first time information holder F/F 15.

Upon receipt of the picture header detection signal from the variable-length code decoder 11, the first time information holder F/F 15 inputs the time information that is held by the aforementioned time information holder 5. That is, the first time information holder F/F 15 inputs the time information in connection with the picture header being detected from the elementary stream. Therefore, the first time information holder F/F 15 sequentially stores a number of time information data in a prescribed decoding order.

The time information data stored in the first time information holder F/F 15 are forwarded to the second time information holder F/F 17 via the buffer 16. In this process, the time information data are appropriately arranged or permuted, so that the second time information holder F/F 17 stores the time information data that are arranged in a display order of pictures. Then, the second time information holder F/F 17 transfers the time information data, which are arranged in the display order of the pictures, to the decode control section 10.

The decode control section 10 compares the time information given from the second time information holder F/F 17 with the reference time 'STC' (namely, System Time Clock) counted by the timer 18. In response to comparison results, the decode control section 10 outputs a stip instruction signal or a repeat instruction signal, which is sent to the variable-length code decoder 11.

Upon receipt of the skip instruction signal or repeat instruction signal from the decode control section 10, the variable-length code decoder 11 skips or repeats pictures. Herein, the skip instruction signal instructs the variable-length code decoder 11 to perform "fast forward" on the elementary stream being input while skipping a prescribed number of pictures contained in the elementary stream, so that the decode execution section 7 decodes the elementary stream in a skip manner. That is, "skip" is to perform fast forward on decoded pictures output from the decoded picture output section 8. The repeat instruction signal instructs the variable-length code decoder 11 to stop inputting the elementary stream, so that the decoded picture output section 8 repeatedly outputs same pictures being decoded.

Next, a brief explanation will be given with respect to types of pictures being compressed by the MPEG system. The MPEG compressed pictures are classified into three types of pictures, namely, I pictures, P pictures and B pictures which are compressed by different compression ratios respectively. Thus, moving pictures are configured by combining together the aforementioned types of pictures. Next, those pictures will be described in detail.
(1) I Picture (Namely, Intraframe Picture)

The I picture is provided to cope with occurrence of error in transmission of bit streams. That is, the I picture is a picture that is coded within a single picture without effecting prediction and is compressed by a low compression ratio which is the lowest among the three types of pictures.
(2) P Picture (Namely, Predictive Picture)

The P picture is made by interframe prediction that is performed in one direction from a past frame to produce differences, which are being coded. The P picture is compressed by a compression ratio that is an intermediate one between compression ratios of the I picture and B picture.
(3) B Picture (Namely, Bidirectional Picture)

The B picture is made by interframe prediction that is performed in two directions between a past frame and a future frame to produce differences, which are being coded. The B picture is compressed by a high compression ratio, which is the highest among the three types of pictures. Because the B picture uses the future frame for prediction, it is necessary to encode and transmit the future frame first. For this reason, frames are subjected to permutation or rearrangement in coding. Then, the coded pictures which are arranged in a prescribed order are subjected to decoding in which they are subjected to permutation or rearrangement again, so that the decoded pictures are to be arranged in an original order.

The motion compensator 14 receives from the two-dimensional inverse discrete cosine transform block (IDCT) 13 an I picture or a P picture, which is then stored in the motion-compensating reference picture storage 2D. Next, the motion compensator 14 receives from the IDTC 13 a B picture, which is to be subjected to prediction based on the I picture or P picture that is previously given prior to the B picture. Hence, the motion compensator 14 reads from the motion-compensating reference picture storage 2D the I picture or P picture, which is added to the B picture given from the IDCT 13 to form a single complete picture being decoded.

The decoded picture output section 8 receives pictures being decoded by the decode execution section 7. Thus, the decoded picture output section 8 permutes and arranges the decoded pictures to be outputted in the display order. In addition, the decoded picture output section 8 sends a picture display signal to the decode control section 10.

Figure 3A:
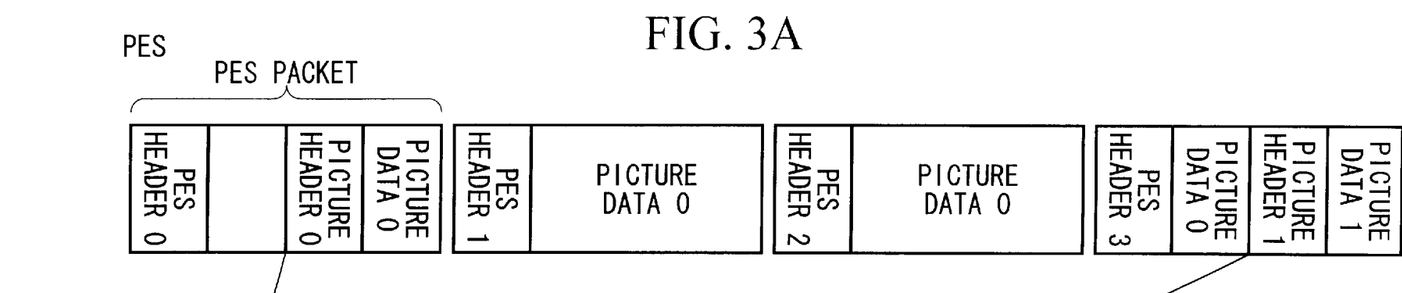
FIG. 3A shows an example of a packetized elementary stream being input to the MPEG decoding device of FIG. 1.
Figure 3B:
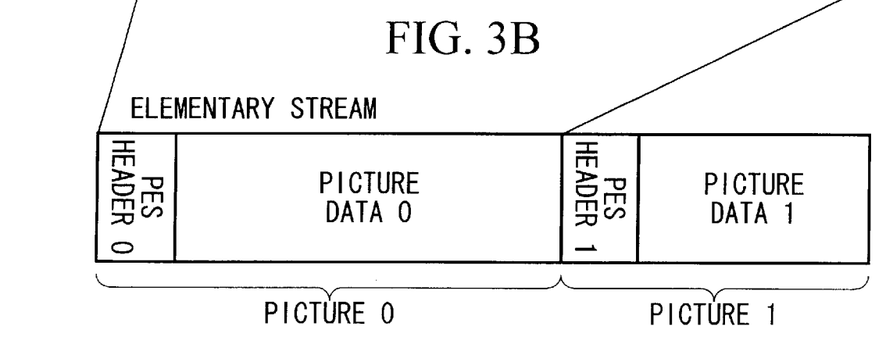
FIG. 3B shows an example of an elementary stream that is extracted from the packetized elementary stream by a PES decoder shown in FIG. 1.

FIG. 3A shows a packetized elementary stream (PES) input to the MPEG decoding device 1, and FIG. 3B shows an elementary stream that is extracted from the PES by the PES decoder 4. A single picture within the elementary stream is configured by a picture header (representing parameters ranging from Sequence layer to Picture layer according to the MPEG standard) and picture data (representing data of lower layers under Slice layer according to the MPEG standard). Namely, "picture 0" is configured by "picture header 0" and "picture data 0" in FIG. 3B. The picture header describes parameters such as a type of the picture. The picture data correspond to compressed picture data that are compressed by the MPEG system. Thus, the elementary stream is configured by a number of pictures which are consecutively arranged in a prescribed order.

The aforementioned elementary stream is divided into multiple blocks, each of which is accompanied with a PES header at its top position to form a PES packet. Namely, the elementary stream is divided into multiple PES packets in order to multiplex bit streams. A packetized elementary stream (PES) is configured by multiple PES packets which are consecutively arranged in a prescribed order.

The PES header contains time information such as presentation time stamp (PTS) and decoded time stamp (DTS). Herein, the PTS represents presentation time (or display time) of picture data contained in the PES packet. In addition, the DTS represents decoded time of the picture data contained in the PES packet. Thus, the MPEG decoder 6 decodes the picture data at the time DTS, and it outputs a decoded picture at the time PTS.

The MPEG standard regulates that time information contained in the PES header of the PES packet containing the picture header is used as time information for picture data that is described following the picture header. In FIG. 3A, time information for picture 0 is contained in PES header 0, and time information for picture 1 is contained in PES header 3, for example.

Figure 4A:
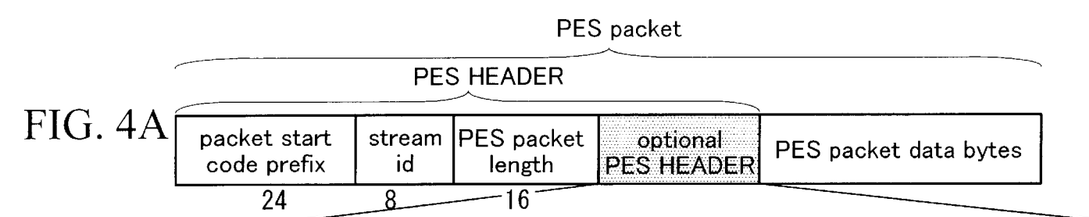
FIG. 4A shows details of a PES packet.

FIGS. 4A to 4E show detailed configurations of the PES packet, which as a whole has a hierarchical structure. The PES packet is mainly configured by a PES header and PES packet data. As shown in FIG. 4A, the PES header is configured by a packet start code of twenty four bits, a stream ID of eight bits, a PES packet length of sixteen bits and an optional PES header. Herein, the PES packet length shows a data length of a packet that follows its preceding field.

Figures 4B, 4C:
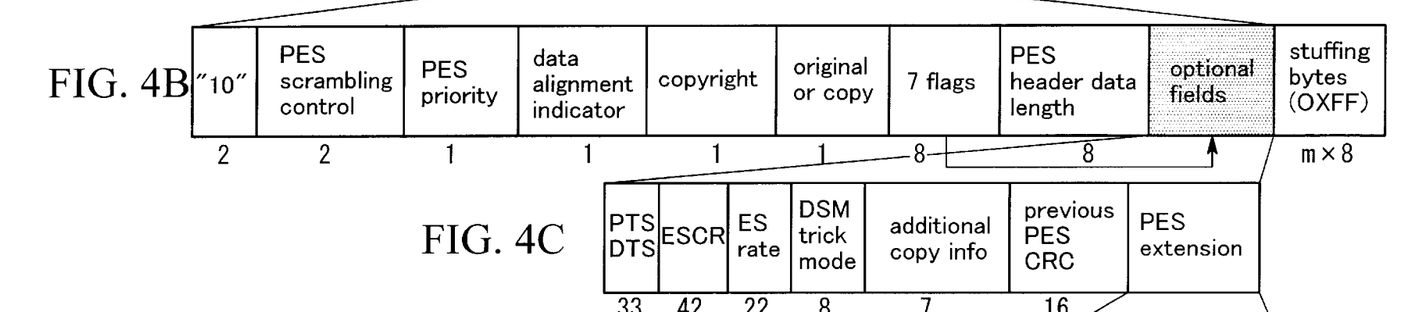
FIG. 4B shows details of an optional PES header included in the PES packet.
FIG. 4C shows details of optional fields shown in FIG. 4B.

As shown in FIG. 4B, the optional PES header is configured by a control code of two bits, PES scrambling control of two bits, PES priority of one bit, data alignment indicator of one bit, copyright of one bit, original or copy of one bit, seven flags of eight bits, a PES header data length of eight bits, optional fields and stuffing bytes of m×8 bits. Herein, the control code is used for discrimination between MPEG 1 and MPEG 2. In the case of MPEG 2, the control code is set to '10' in binary notation.

The PES scrambling control designates scrambling of data (or recombination of data strings) by which data are made confidential and used for commercial telecommunication systems, for example. The PES priority is used to discriminate packets in consideration of significance in application. That is, the packets are divided into "significant" packets and "insignificant" packets which can be discarded on demand. In addition, the significant packets are enhanced by bit error measures in transmission. The copyright is used to show existence of a copyright on video signals and/or audio signals. The stuffing bytes correspond to "dummy" data bytes, which are used to secure a constant data length of the packet regardless of existence of the PTS and DTS. That is, the stuffing bytes are described to fill the field of the packet that does not have the PTS and DTS.

As shown in FIG. 4C, the optional fields are configured by time information of thirty three bits containing the PTS and DTS, ESCR of forty two bits, ES rate of twenty two bits, DSM trick mode control data of eight bits, additional copy information of seven bits, previous PES CRC of sixteen bits and PES extension control.

The DSM trick mode control data is information used to indicate that a video stream originally recorded on recording media such as a magnetic tape is subjected to special reproduction and is differed from original bit stream, for example.

Figure 4D:
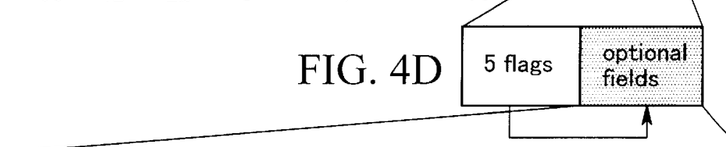
FIG. 4D shows details of PES extension control shown in FIG. 4C.
Figure 4E:
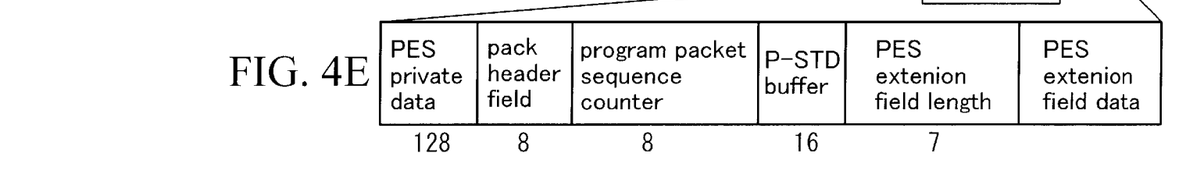
FIG. 4E shows details of optional fields shown in FIG. 4D.

As shown in FIG. 4D, the PES extension control is configured by five flags and optional fields. As shown in FIG. 4E, the optical fields are configured by PES private data of one-hundred and twenty eight bits, pack header field of eight bits, program packet sequence counter of eight bits, P-STD buffer of seven bits, PES extension field length of seven bits and PES extension field data.

As described above, the PES header contains a variety of information and data in addition to the time information. For example, the PES header may contain information as to whether the packet is given priority to be repeated or skipped.

Thus, the present embodiment of this invention provides simple correspondence between the time information and picture(s) as well as simple correspondence between other pieces of information of the PES packet, other than the time information, and the picture(s).

Figure 5A:
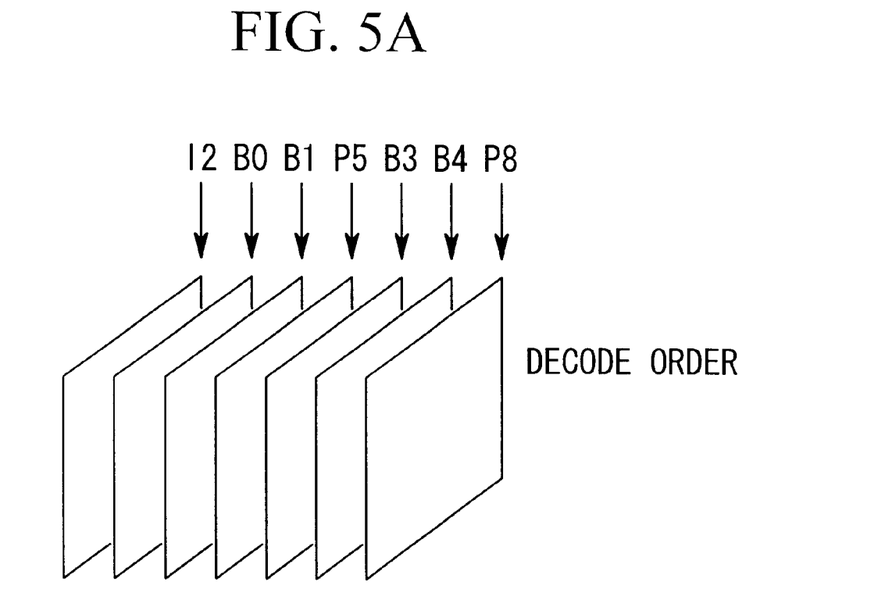
FIG. 5A shows arrangement of pictures in a decode order.
Figure 5B:
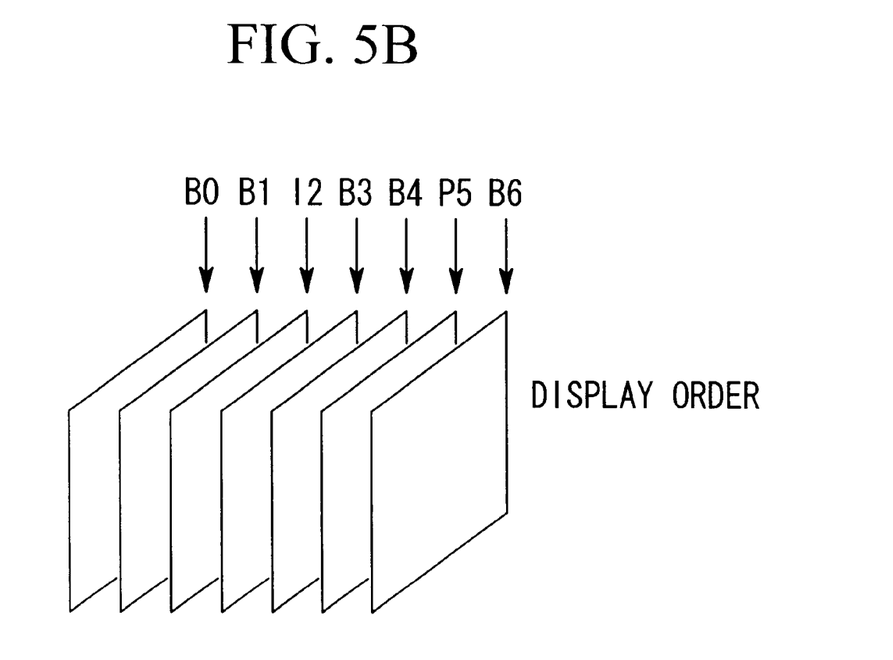
FIG. 5B shows arrangement of pictures in a display order.

The aforementioned decoded picture output section 8 changes arrangement of pictures from a decode order to a display order, which will be described with reference to FIGS. 5A and 5B, wherein reference symbols I, P and B respectively designate I picture, P picture and B picture, and numerals designate numbers of places in the order. The pictures that are compressed by the MPEG system are subjected to decoding in a decode order, while they are subjected to display in a display order. In some cases, the decode order differs from the display order in arrangement of the pictures.

In the decoded picture output section 8, arrangement the pictures is changed in order from the decode order to the display order. At the same time, in the time information management section 9, arrangement of time information data is changed in order from the decode order to the display order. Thus, the time information holder F/F 17 of the time information management section 9 stores the time information data which are arranged in the display order in connection with the pictures.

Next, operations of the MPEG decoding device 1 will be described in detail with reference to FIG. 1. The MPEG decoding device 1 inputs three packetized elementary streams A, B and C, which are respectively stored in the code buffers 2A, 2B and 2C in an original PES form.

The selector 3 selects one of the packetized elementary streams A, B and C respectively output from the code buffers 2A, 2B and 2C by the time division system. The selected packetized elementary stream is forwarded to the PES decoder 4.

The PES decoder 4 separates the packetized elementary stream into a PES header and an elementary stream. Thus, the PES decoder 4 delivers time information contained in the PES header to the time information holder 5 while delivering the elementary stream to the MPEG decoder 6.

The MPEG decoder 6 sequentially inputs elementary streams from the PES decoder 4 at desired timings that are determined in consideration of a speed of decoding pictures. That is, the MPEG decoder 6 inputs a next elementary stream in conformity with a decoding speed of pictures contained in the elementary stream presently input. In synchronization with inputting of the elementary stream, the MPEG decoder 6 inputs from the time information holder 5 the time information in connection with the pictures of the elementary stream.

Next, operations of the MPEG decoder 6 will be described in detail with reference to FIG. 2. The elementary stream output from the PES decoder 4 is supplied to the decode execution section 7 of the MPEG decoder 6 in which the elementary stream is to be decoded. Specifically, decoding of the elementary stream is executed by the variable-length code decoder (VLD) 11, inverse quantizer (IQ) 12, two-dimensional inverse discrete cosine transform block (IDCT) 13 and motion compensator (MC) 14. When detecting a picture header from the elementary stream, the variable-length code decoder 11 outputs a picture header detection signal to the first time information holder F/F 15 of the time information management section 9.

Upon receipt of the picture header detection signal, the first time information holder F/F 15 inputs the time information output from the time information holder 5. Herein, the first time information holder F/F 15 stores the time information of the PES header that is described just before the picture header in the packetized elementary stream. Thus, it stores the time information for the pictures that are presently decoded by the decode execution section 7.

As a result of the decoding executed by the decode execution section 7, the motion compensator 14 outputs decoded pictures which are arranged in the decode order. The decoded picture output section 8 changes arrangement of the pictures in order from the decode order to the display order. Thus, the decoded picture output section 8 outputs the decoded pictures which are rearranged in the display order. In synchronization with outputting of the decoded pictures, the decoded picture output section 8 outputs a picture display signal to the decode control section 10.

In the time information management section 9, the first time information holder F/F 15 stores the time information data that are originally arranged in the decode order. Then, arrangement of the time information data is changed in order from the decode order to the display order. Thus, the second time information holder F/F 17 stores the time information data that are rearranged in the display order.

The decode control section 10 compares a timer value, which the timer 18 counts when the picture display signal is supplied thereto from the decoded picture output section 8, with the time information output from the second time information holder F/F 17. If the time information is greater than the timer value, the decode control section 10 outputs a repeat instruction signal to the variable-length code decoder 11 of the decode execution section 7. Thus, the variable-length code decoder 11 stops inputting new elementary streams, so that the decoded picture output section 8 repeatedly outputs the same decoded pictures corresponding to the elementary stream previously input. If the time information is smaller than the timer value, the decode control section 10 outputs a skip instruction signal to the variable-length code decoder 11. Thus, the variable-length code decoder 11 performs fast forward in inputting elementary streams, so that the decode execution section 7 selectively decodes pictures while skipping a predetermined number of pictures. As a result, the decoded picture output section 8 performs fast forward in outputting the decoded pictures. As described above, the MPEG decoder 6 performs a series of operations to decode and output pictures in response to time information of PES headers. Thus, it is possible to adequately display decoded pictures in accordance with the time information.

The aforementioned operations are performed on the three packetized elementary streams (PES) A, B and C by the time division system. Thus, it is possible to decode the three PESs A, B and C by using only a single set of the PES decoder 4, time information holder 5 and MPEG decoder 6.

The present embodiment is designed to decode three packetized elementary streams by the time division system. Of course, this invention is not necessarily limited to the present embodiment with regard to the number of the packetized elementary streams being decoded. For example, it is possible to easily modify the present embodiment such that four packetized elementary streams are decoded by the time division system. That is, this invention provides any types of configurations that generally decode multiple packetized elementary streams by the time division system.

The present embodiment is described such that the time information is connected with the pictures. Of course, this invention is not necessarily limited to the present embodiment with regard to relationships between information and data within packetized elementary streams. For example, it is possible to easily modify the present embodiment such that all information data contained in PES headers are connected with pictures.

The present embodiment is described such that the packetized elementary streams are specifically used for video signals. Of course, this invention is applicable to any types of systems that deal with packetized elementary streams representing audio signals other than the video signals.

As described heretofore, this invention has a variety of effects and technical features, which are described below.

(1) The MPEG decoding device of this invention is designed such that code buffers for respectively storing packetized elementary streams (PES) are followed by a single PES decoder, which is capable of processing multiple PESs. This eliminates necessity in that multiple PES decoders are provided for processing of multiple PESs respectively. Thus, it is possible to reduce a circuit configuration of the MPEG decoding device in scale.

(2) Because of simplicity of the circuit configuration of the MPEG decoding device that installs a single set of the PES decoder, time information holder and MPEG decoder, it is possible to easily extract from a packetized elementary stream a PES header, and it is possible to easily connect time information of the PES header with its corresponding pictures contained in an elementary stream.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. An MPEG decoding device that decodes a plurality of packetized elementary streams representing video signals, comprising:

a plurality of code buffers for respectively storing the plurality of packetized elementary streams input thereto;

a selector for selecting one of the plurality of packetized elementary streams respectively stored in the plurality of code buffers by a time division system;

a PES decoder for separating the packetized elementary stream selected by the selector into a PES header and an elementary stream;

a PES header information holder for holding PES header information extracted from the PES header; and an MPEG decoder for decoding the elementary stream with reference to the PES header information.

2. An MPEG decoding device according to claim 1 wherein the PES header information is time information indicating times for displaying pictures contained in the elementary stream.

3. An MPEG decoding device according to claim 2 wherein the MPEG decoder comprises a decode execution section for executing decoding on the elementary stream and a time information management section for managing the time information, and wherein when the decode execution section detects a picture header, which is located at a top position of each picture, from the elementary stream, the time information management section inputs the time information held by the PES header information holder.

4. An MPEG decoding device that decodes a plurality of packetized elementary streams representing audio signals, comprising:

a plurality of code buffers for respectively storing the plurality of packetized elementary streams input thereto;

a selector for selecting one of the plurality of packetized elementary streams respectively stored in the plurality of code buffers by a time division system;

a PES decoder for separating the packetized elementary stream selected by the selector into a PES header and an elementary stream;

a PES header information holder for holding PES header information extracted from the PES header; and an MPEG decoder for decoding the elementary stream with reference to the PES header information.

5. An MPEG decoding device according to claim 4 wherein the PES header information is time information indicating times for outputting frames contained in the elementary stream.

6. An MPEG decoding device according to claim 5 wherein the MPEG decoder comprises a decode execution section for executing decoding on the elementary stream and a time information management section for managing the time information, and wherein when the decode execution section detects a frame top from the elementary stream, the time information management section inputs the time information held by the PES header information holder.

7. An MPEG decoding device that decodes a plurality of packetized elementary streams representing video signals, comprising:

a plurality of code buffers for storing the plurality of packetized elementary streams respectively;

a selector for selecting one of the plurality of packetized elementary streams respectively output from the plurality of code buffers by a time division system;

a PES decoder for separating the packetized elementary stream selected by the selector to a PES header and an elementary stream;

a time information holder for holding time information being extracted from the PES header; and an MPEG decoder for decoding the elementary stream with reference to the time information, wherein the MPEG decoder decodes pictures of the elementary streams in a decode order in connection with the time information, then, decoded pictures are rearranged and output in a display order.

* * * * *